United States Patent
Seki: Masaki et al.

[11] Patent Number: 5,453,674
[45] Date of Patent: Sep. 26, 1995

[54] NUMERICAL CONTROL APPARATUS

[75] Inventors: Seki: Masaki, Tokyo; Masako Sudo, Tsukuba; Syuji Matsuura, Kodaira, all of Japan

[73] Assignee: Fanuc Ltd., Yamanashi, Japan

[21] Appl. No.: 244,428

[22] PCT Filed: Oct. 1, 1993

[86] PCT No.: PCT/JP93/01416

§ 371 Date: May 26, 1994

§ 102(e) Date: May 26, 1994

[87] PCT Pub. No.: WO94/09419

PCT Pub. Date: Apr. 28, 1994

[30] Foreign Application Priority Data

| Oct. 9, 1992 | [JP] | Japan | 4-271326 |
| Oct. 12, 1992 | [JP] | Japan | 4-272591 |
| Oct. 12, 1992 | [JP] | Japan | 4-272592 |

[51] Int. Cl.[6] .................. G05B 19/18
[52] U.S. Cl. ............ 318/573; 318/571; 318/569; 364/474.2; 364/474.24
[58] Field of Search .......... 318/560–646; 364/474.01–474.32, 192, 191, 190

[56] References Cited

U.S. PATENT DOCUMENTS

| 3,634,664 | 1/1972 | Valek | 318/561 |
| 3,665,493 | 5/1972 | Glowzewski et al. | 318/571 |
| 3,748,562 | 7/1973 | Takegawa et al. | |
| 3,783,253 | 1/1974 | Anderson et al. | |
| 4,503,373 | 3/1985 | Nozawa et al. | 318/570 |
| 4,509,126 | 4/1985 | Olig et al. | 318/561 |
| 4,591,771 | 5/1986 | Nozawa et al. | 318/569 |
| 4,608,643 | 8/1986 | Breitenstein et al. | |
| 4,617,635 | 10/1986 | Shimizu | 364/474 |
| 4,663,705 | 5/1987 | Kishi et al. | 364/191 |
| 5,124,621 | 6/1992 | Kawamura et al. | 318/569 |
| 5,200,680 | 4/1993 | Sasaki et al. | 318/571 |
| 5,206,813 | 4/1993 | Otsubo et al. | 364/474.24 |
| 5,239,159 | 8/1993 | Masuda | 364/474.08 |
| 5,247,451 | 9/1993 | Sawamura et al. | 364/474.2 |
| 5,315,503 | 5/1994 | Kato et al. | 364/192 |
| 5,371,452 | 12/1994 | Kato | 318/610 |

FOREIGN PATENT DOCUMENTS

| 063606 | 11/1982 | European Pat. Off. |
| 63-263502 | 10/1988 | Japan |
| 2-279252 | 11/1990 | Japan |
| 4-193449 | 7/1992 | Japan |
| 1369194 | 2/1974 | United Kingdom |
| 2054199 | 2/1981 | United Kingdom |
| 2216287 | 4/1989 | United Kingdom |

*Primary Examiner*—Paul Ip
*Attorney, Agent, or Firm*—Staas & Halsey

[57] ABSTRACT

A numerical control apparatus in which tool feed can be stopped at the same time as machining is completed. An interpolating device in a numerical control apparatus interpolates a pulse signal HP supplied from a manual pulse generator and outputs an interpolated pulse signal CP so that the tool is moved along a designated shape prestored in a graphic data memory device. An axis control circuit generates speed commands for respective axes in response to the interpolated pulse signal CP and sends the generated commands to a servo amplifier. The servo amplifier delivers a drive current I to energize servomotors mounted on a machine tool. A load determination device detects the drive current I from the servo amplifier and determines whether the detected current I decreases at a given ratio. When the drive current I decreases, for example, by 5%, a drive stop signal S is supplied. The interpolating device stops outputting the interpolated pulse signal CP in response to the drive stop signal S, and the tool feed is stopped accordingly.

12 Claims, 10 Drawing Sheets

NUMERICAL CONTROL APPARATUS

BACKGROUND OF THE INVENTION

1. Field of the Invention

The present invention relates to a numerical control apparatus for controlling a machine tool, and more particularly, to a numerical control apparatus for controlling a machine tool which machines prototypes or the like.

2. Description of the Related Art

Advances in the technology of numerically controlled machine tools have been so great that they can machine workpieces of complex shape at high speed with precision. At present, workpieces of complex shape cannot be machined without numerically controlled machine tools.

To generate machining programs, there are widely used interactive numerical control apparatus which comprise a numerical control apparatus with an interactive program generating function, and automatic programming apparatus for simply generating complex machining programs.

In the use of such numerical control apparatus, it is necessary to accurately define machine coordinates, a machine origin, program coordinates, a machining origin, and other data for generating strict machining programs. The interactive numerical control apparatus and the automatic programming apparatus can be used to machine a number of workpieces.

For some machining processes for producing a prototype or a model, general-purpose milling machines, lathes, and the like are used which require less time to carry out preparatory action such as attachment and detachment of workpieces, installation of tools, etc., and does not require less time to generate machining programs. Machining on such machines or lathes has been carried out solely at the determination of the operator.

Problems of general-purpose machine tools are that available operators who can handle general-purpose machine tools decrease, and that it is difficult for the general-purpose machine tools to carry out oblique linear machining, arcuate machining, or the like though they can effect linear machining without any problem.

If, on the other hand, a general numerically controlled machine tool is used to machine a prototypes or a model, then it is necessary to accurately define machine coordinates, a machine origin, program coordinates, a machining origin, and other data. While it is not impossible to define those data, the required programming process is too time-consuming and troublesome for machining a portion of a single workpiece.

To solve the above problems, the applicant has filed Japanese patent application No. 4-231836 on a numerical control apparatus which employs a general-purpose machine tool for carrying out simple machining processes to machine prototypes or the like.

Such a numerical control apparatus feeds a tool during machining in accordance with an operator's operation of a manual pulse generator and jog feed buttons. An operator machines a workpiece while checking machining processes and stops the operation at the time when the machining is completed. Therefore, if there is a delay in the operator's stop operation, the tool continues to be moved and unnecessary machining actions are carried out. If the tool is exceedingly fed due to a careless operation, the tool may strike any object other than the workpiece, which is dangerous.

For carrying out simple machining processes to machine prototypes or the like, generally, the operator operates the manual pulse generator and the jog feed buttons to machine a workplace while checking the machining processes in order.

Accordingly, while it is possible to switch a single pulse generator to use for controlling respective axes, operability of the numerical control apparatus is impaired since frequency of switching action increases.

Conversely, if a handle for moving the tool corresponding to a designated shape such as an oblique straight line, circular arc, or the like is separately provided as well as handles for respective machining axes in X-axis, Y-axis, and Z-axis direction, additional cost is required.

Furthermore, with the numerical control apparatus mentioned above, designation of a tool moving direction is easy if the tool is to be moved in the direction parallel to either the X-axis, Y-axis, or Z-axis. However, when it is required to move the tool in two or more axis directions simultaneously as is the case to machine an oblique straight line, circular arc, or the like, much time and labor are required since the tool is not necessarily moved in the desired direction by a simple operation of the manual pulse generator and jog feed buttons.

SUMMARY OF THE INVENTION

In view of the above problems, it is an object of the present invention to provide a numerical control apparatus in which a tool feed is stopped at the same time when machining of a workpiece is completed in the case that the tool is fed to machine a workpiece by operating a manual pulse generator and jog feed buttons.

Another object of the present invention is to provide a numerical control apparatus with excellent operating characteristics to facilitate simple machining to machine prototypes or the like using a general purpose machine tool.

Still another object of the present invention is to provide a numerical control apparatus in which a moving direction of a tool can be easily determined when a guidance function is executed.

To achieve the above objects, there is provided in accordance with the present invention a numerical control apparatus for controlling a machine tool having at least two axes, comprising graphic data memory means for storing a designated shape entered and formed in an interactive fashion according to guidance information, load determination means for determining a detected load of a servomotor to check whether the detected load decreases by a given ratio and outputting a drive stop signal if the load decreases by the given ratio, movement command means for outputting a pulse signal to command movement of a tool, and interpolating means for interpolating the pulse signal, outputting an interpolated pulse signal to move the tool along the designated shape and stopping output of the interpolated pulse signal in response to the drive stop signal.

When the operator enters the designated shape such as a straight line, circular arc, or the like in an interactive fashion through a keyboard or the like according to guidance information displayed on a display unit, the graphic data memory means stores the entered designated shape.

The load determination means determines the detected load, for example a servomotor drive current, to check whether the load decreases by the given ratio, and outputs the drive stop signal if the load decreases by the given ratio.

The movement command means is, for example, a manual pulse generator or a jog feed button, and outputs the pulse signal for commanding movement of the tool. The interpolating means interpolates the pulse signal from the movement command means, outputs the interpolated pulse signal so as to move the tool parallel to the designated shape, and stops the output of the interpolated pulse signal in response to the drive stop signal from the load determination means.

The time when the load of the servomotor decreases by the given ratio during machining is the time when the tool is just detached from the workpiece based on the completion of the machining. The tool feed can be stopped at the same time when the machining is completed since the tool feed is stopped according to the above mentioned determination, resulting in prevention of unnecessary machining actions of the tool.

DETAILED DESCRIPTION OF THE PREFERRED EMBODIMENTS

An embodiment of the present invention will be described hereinafter with reference to the drawings.

Figure 1:
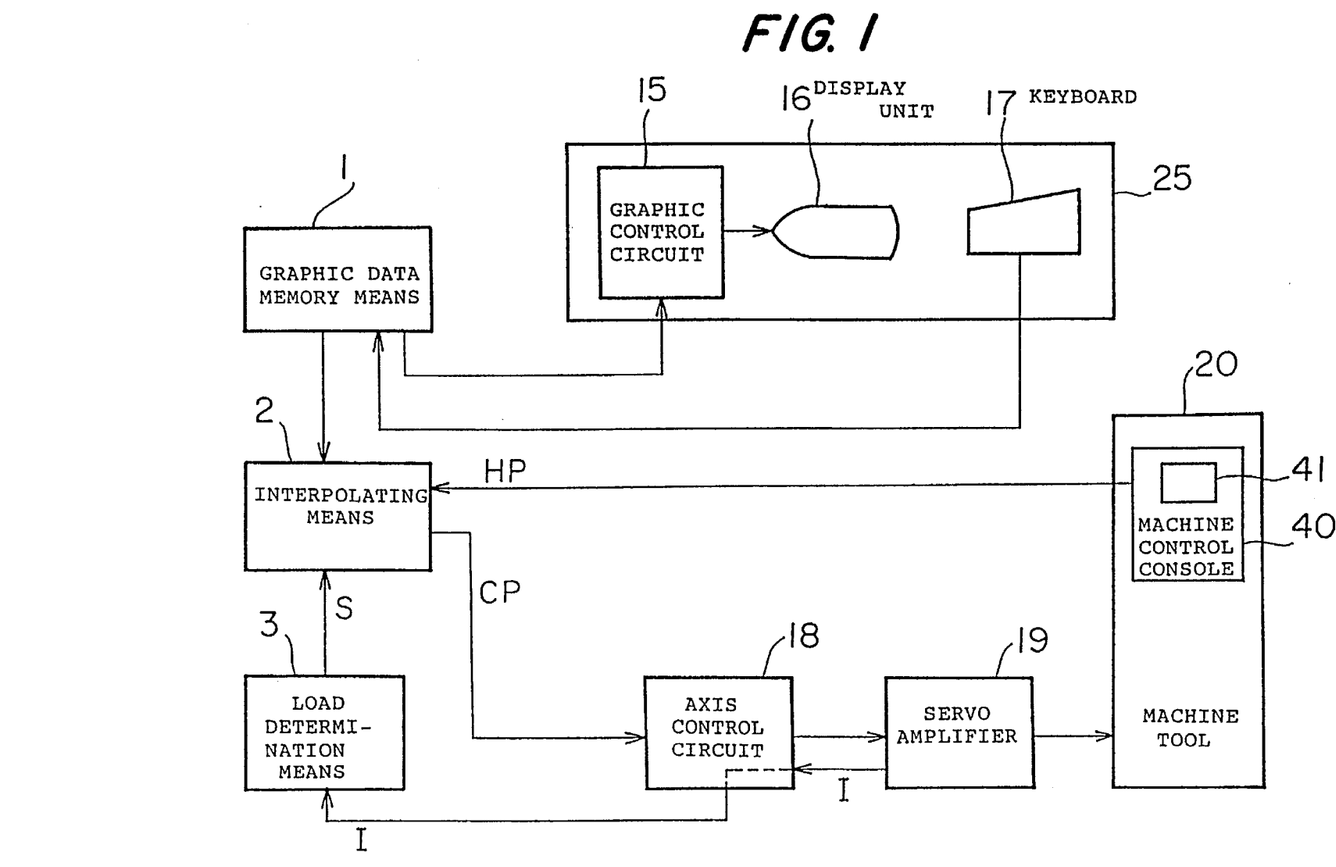
FIG. 1 is a schematic diagram of a numerical control apparatus according to a first embodiment of the present invention.

FIG. 1 schematically illustrates a numerical control apparatus according to a first embodiment of the present invention. The numerical control apparatus has a graphic data memory means 1 for displaying guidance information through a graphic control circuit 15 on a display unit 16. The graphic data memory means 1 also stores a designated shape such as a straight line, circular arc, or the like which has been entered in an interactive fashion by the operator through a keyboard 17. The stored designated shape is displayed on the display unit 16 through the graphic control circuit 15 as required.

An interpolating means 2 interpolates a pulse signal HP transmitted from a manual pulse generator 41, outputs an interpolated pulse signal CP so that a tool moves parallel to the designated shape stored in the graphic data memory means 1, and feeds the interpolated pulse signal CP to an axis control circuit 18, which actually comprises circuits for respective three axes. In response to the interpolated pulse signal CP from the interpolating means 2, the axis control circuit 18 generates speed commands for the respective axes, and sends the speed commands to a servo amplifier 19. The servo amplifier 19 delivers a drive current I to energize servomotors on a machine tool 20 to control the machine tool 20.

On the other hand, a load determination means 3 detects a drive current I of the servo amplifier 19 via the axis control circuit 18 and determines the detected current I to check whether the current I decreases at a given ratio. This determination is made based on a current value $I_o$ which is a value when a drive current I is stabilized steadily during the actual machining. When the drive current $I_o$ decreases by a given ratio (for example, 5%), the load determination means 3 outputs a drive stop signal S to the interpolating means 2 mentioned above.

Upon receipt of the drive stop signal S, the interpolating means 2 stops outputting the interpolated pulse signal CP, thereby the tool feed is stopped. The manner of the tool feed stop operation will now be described with reference to FIG. 2.

Figure 2:
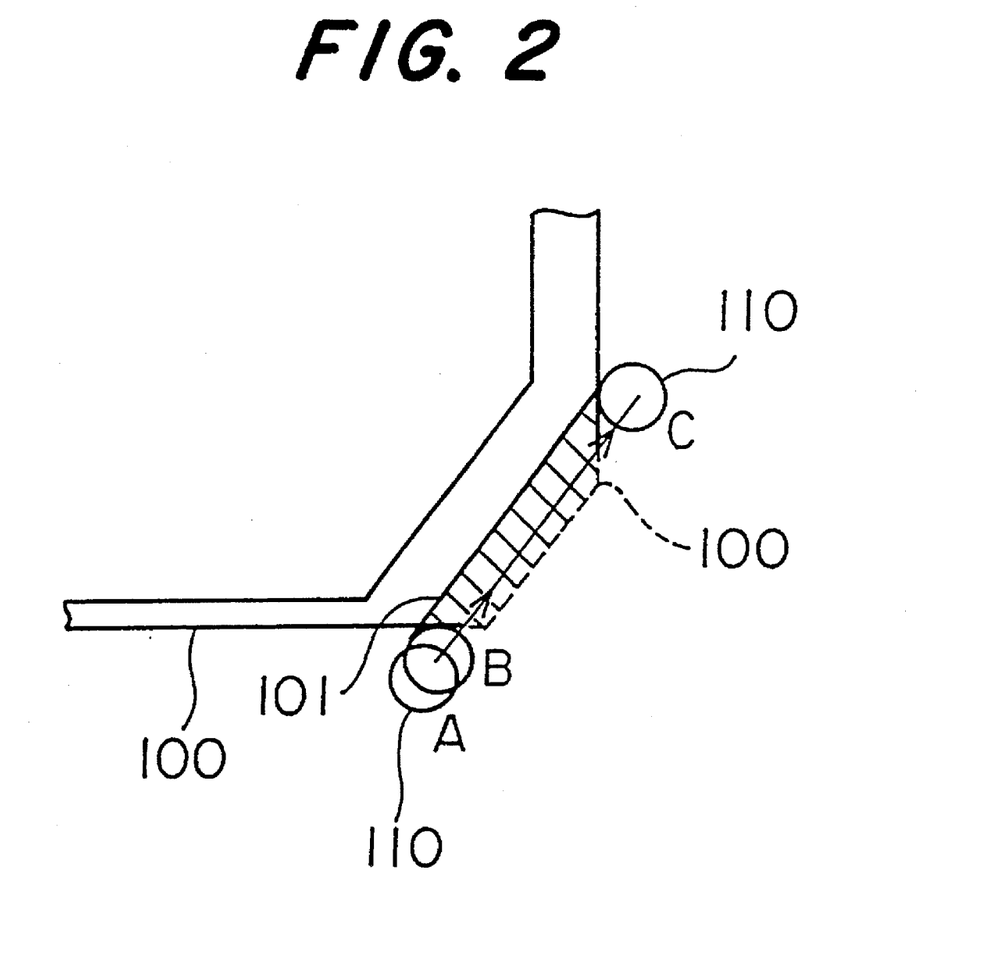
FIG. 2 is a diagram of assistance in explaining a tool feed stop operation depending on a load determination of the present invention.

The tool feed stop operation depending on the load determination is illustrated in FIG. 2, in which a shadowed area is removed from a workpiece 100 by a tool 110. The tool 110 starts moving from a point A according to operation of a manual pulse generator 41 and the like by an operator. A shape of a surface obtained by machining is prestored in the above graphic data memory means 1 as a designated shape, and the tool 110 moves along the designated shape. The tool 110 begins to be loaded at a point B. When machining starts, the current I mentioned above is stabilized to $I_o$. As the tool 110 reaches to a point C when the machining is completed, the load to the tool 110 decreases, resulting in reduction of the drive current I. At this time, the load determination means 3 mentioned above determines the reduction of the load. That is, when the drive current I reaches to the drive current $I_o$ which is supplied during stable machining and decreases by the given ratio (for example, 5%), the above load determination means 3 detects the first reduction of the current, and then outputs the drive stop signal S. The tool stops at a point C immediately in response to the signal S.

Figure 3:
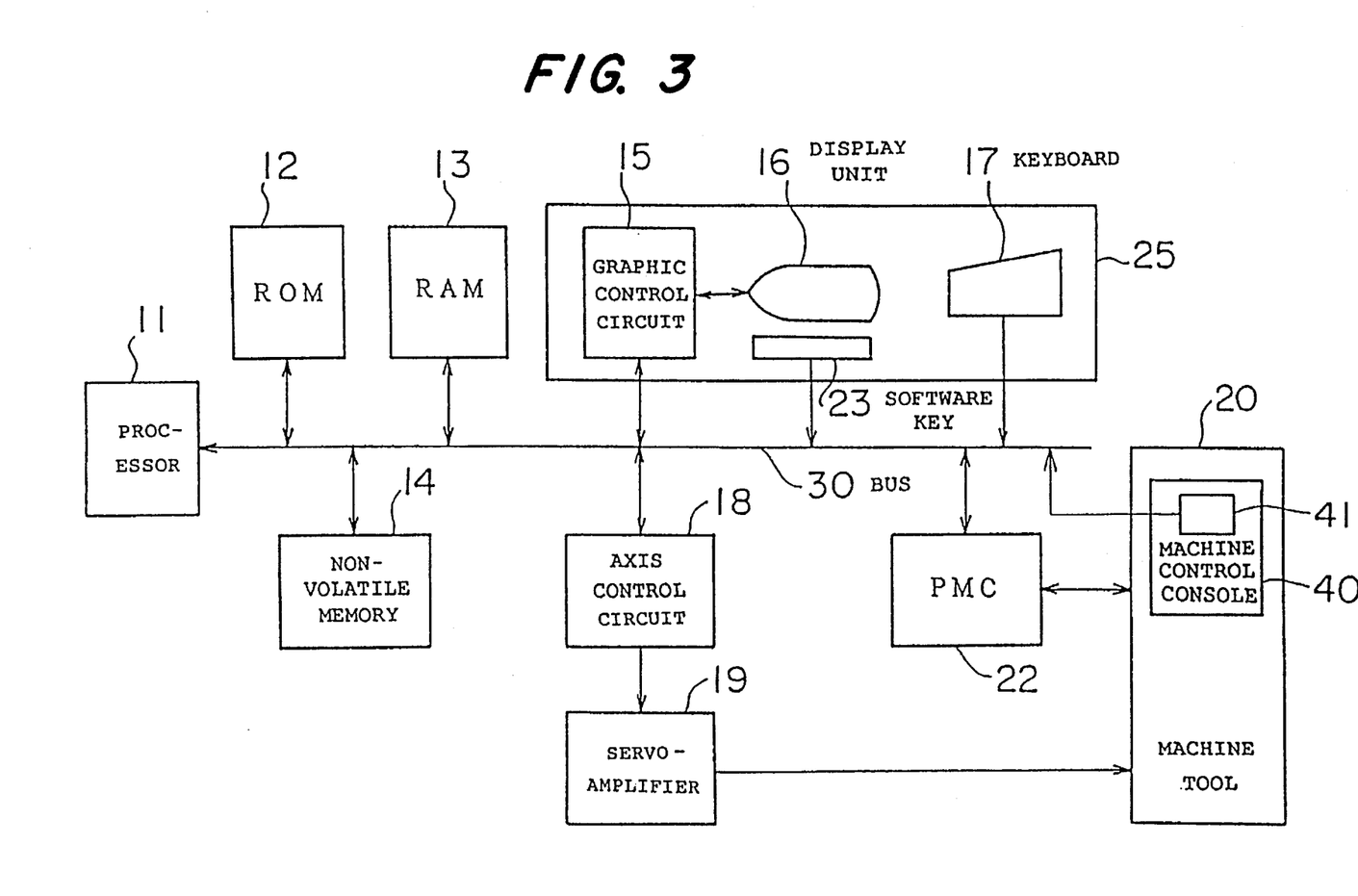
FIG. 3 is a block diagram of a hardware arrangement of the numerical control apparatus of the present invention.

FIG. 3 is a block diagram of a hardware arrangement of the numerical control apparatus according to the first embodiment. A processor 11 controls the numerical control apparatus in its entirety according to a system program stored in a ROM 12. The graphic data memory means 1, the interpolating means 2, and the load determination means 3 shown in FIG. 1 are software-implemented functions performed by the processor 11 according to the system program stored in the ROM 12. The ROM 12 comprises an EPROM or an EEPROM. A RAM 13, which comprises an SRAM or the like, stores temporary data such as input and output signals and the like. A nonvolatile memory 14 comprises a CMOS that is backed up by a battery (not shown). The nonvolatile memory 14 stores various data such as parameters, machining programs, etc. which are to be retained after the power supply is turned off.

The graphic control circuit 15 converts guidance information, entered designated shape data, and the like in a displayable signal, and supplies the displayable signal to the display unit 16. The display unit 16 comprises a CRT or a liquid crystal display panel. The axis control circuit 18 (for three axes) receives axis movement commands including the interpolated pulse signal CP from the processor 11 and outputs the axis movement commands to the servo amplifier 19 (for three axes). In response to the axis movement commands, the servo amplifier 19 outputs the drive current I to energize the servomotors (not shown) on the machine tool 20.

The drive current I supplied from the servo amplifier 19 is detected as the load to the servomotor and data obtained in such a way are stored in the RAM 13 at any time. As mentioned above, the processor 11 always monitors the load current I.

The machine tool 20 has, in addition to the servomotors, the machine control console 40 operable for entering movement commands as described in detail later on. These components are interconnected by a bus 30.

A PMC (programmable machine controller) 22 receives a T function signal (tool selection command) and the like through the bus 30 when a machine program is to be executed. The PMC processes the received signal according to a sequence program, and outputs a signal as an operation command to control the machine tool 20. In an interactive numerical control apparatus configuration, the PMC 22 receives a status signal from the machine tool 20, processes the received signal according to a sequence program, and transfers a required input signal to the processor 11 through the bus 30.

To the bus 30, there is also connected a software key 23 whose function varies depending on the system program and the like. The software key 23, the display unit 16, and the keyboard 17 are mounted on a CRT/MDI panel 25.

Figure 4:
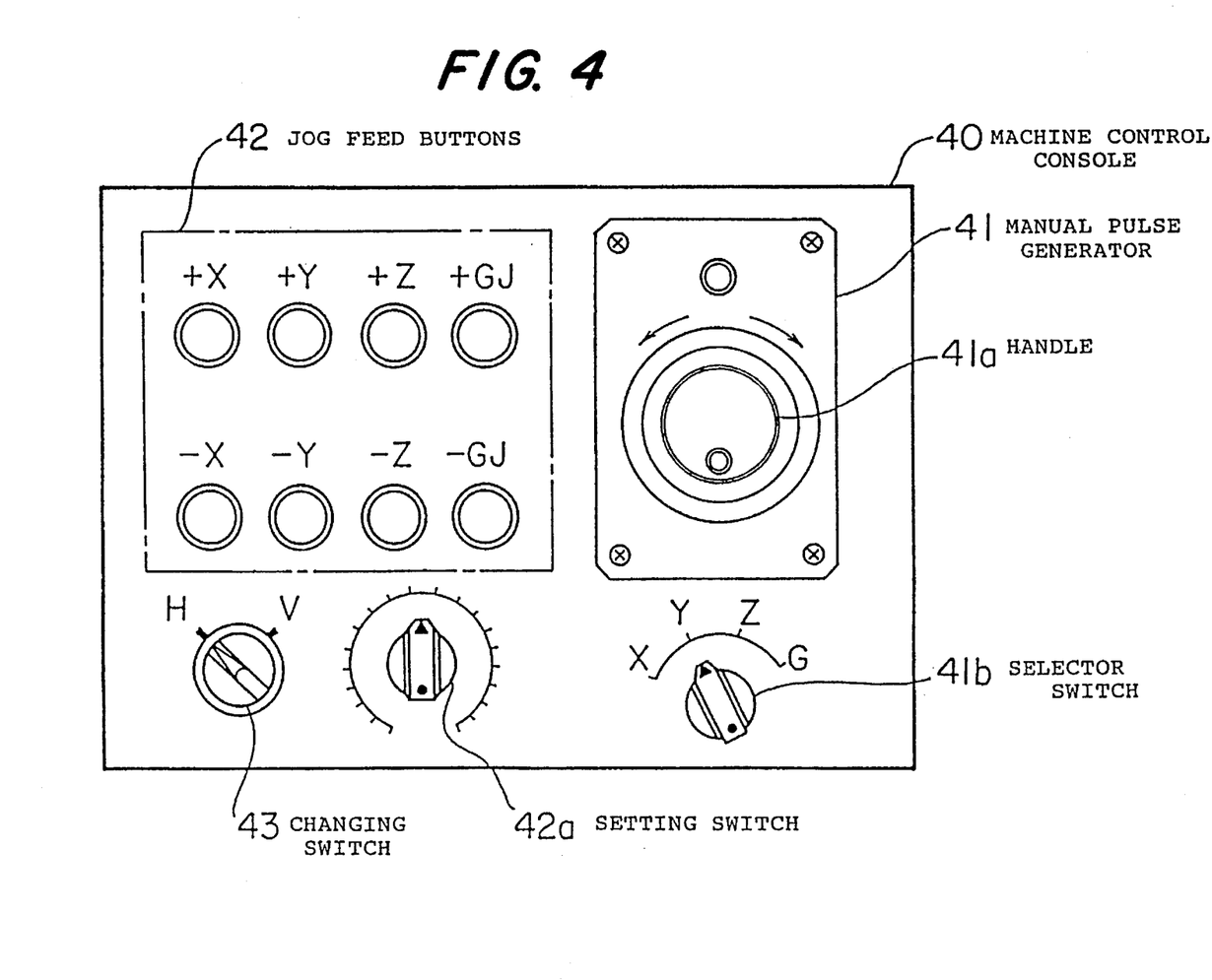
FIG. 4 is a view showing a machine control console by way of example.

FIG. 4 is a view showing the machine control console on a machine tool by way of an example. The machine control console 40 shown in FIG. 4 has the manual pulse generator 41, a selector switch 41b, jog feed buttons 42, a setting switch 42a, and a changing switch 43.

When a handle 41a is turned to the left or right, the manual pulse generator 41 generates a pulse signal depending on the rotation of the handle 41a. The pulse signal, which is composed of two-phase pulses for determining the direction in which the handle 41a is turned, is sent through the bus 30 to the processor 11 for moving the tool. The selector switch 41b is a switch for selecting a pulse signal generated by the manual pulse generator 41 in either an X-axis direction (X), a Y-axis direction (Y), a Z-axis direction (Z), or a direction (G) which corresponds to the designated shape. When the workpiece machining mentioned above is carried out by operating the manual pulse generator, the selector switch 41b is set to (G).

The jog feed buttons 42 comprise a total of 8 buttons including positive and negative feed buttons "+X", "–X" "+Y" "–Y" "+ Z" and "–Z" for the respective axes, and positive and negative feed buttons "+GJ", "–GJ" corresponding to the designated shape. When the above tool movement is to be effected by operating a jog feed button 42, the feed button "+GJ" is used.

The setting switch 42a sets the number of pulses in a certain period of time which are generated when the jog feed buttons 42 are pressed.

The changing switch 43 is a switch for selecting whether the tool is to be moved parallel to a designated shape or to be moved perpendicularly to the designated shape, when "G" is selected by the selector switch 41b and the manual pulse generator 41 is operated. When the changing switch 43 is set to "H", the tool moves parallel to the designated shape. When the changing switch 43 is set to "V", the tool moves perpendicularly to the designated shape.

In order for the operator to move the tool manually, it is required to set the selector switch 41b and the changing switch 63 so that a desired direction is selected, then rotate the handle 41a as appropriate. In order for the operator to move the tool in jog feed mode, it is required to set a desired feed rate by rotating the setting switch 42a and press the jog feed button 42 for a desired direction.

As described above, the tool feed is stopped if the drive current I of the servomotor decreases by a given ratio (for example, 5%) when the manual pulse generator 41 and the like is operated to move the tool parallel to the designated shape for machining a workpiece. The time when the current I decreases is the time when the tool is just detached from the workpiece at the completion of the machining. The tool feed can be stopped at the same time when the machining is completed since the tool feed is stopped according to the determination mentioned above, resulting in prevention of unnecessary machining actions of the tool and some dangerous situations caused by excessive feed of the tool or any other reason.

In the above embodiment, the tool feed is stopped only when the drive current decreases by a given ratio. However the tool feed may be stopped when the drive current decreases to a predetermined value or less.

In the above embodiment, the tool feed stop function is available from a numerical control apparatus which is incorporated in a general-purpose machine tool. However, the tool feed stop function may be available from an ordinary numerically controlled machine tool.

As described above, in the present invention, the tool feed is stopped if the load of the servomotor decreases by a given ratio when a workpiece is machined with moving the tool along the designated shape by operating the movement command means such as the manual pulse generator or the like. The time when the load of the servomotor decreases is the time when the tool is just detached from the workpiece at the completion of the machining. The tool feed can be stopped at the same time when the machining is completed since the tool feed is stopped according to the determination mentioned above, resulting in prevention of unnecessary machining actions of the tool.

Figure 5:
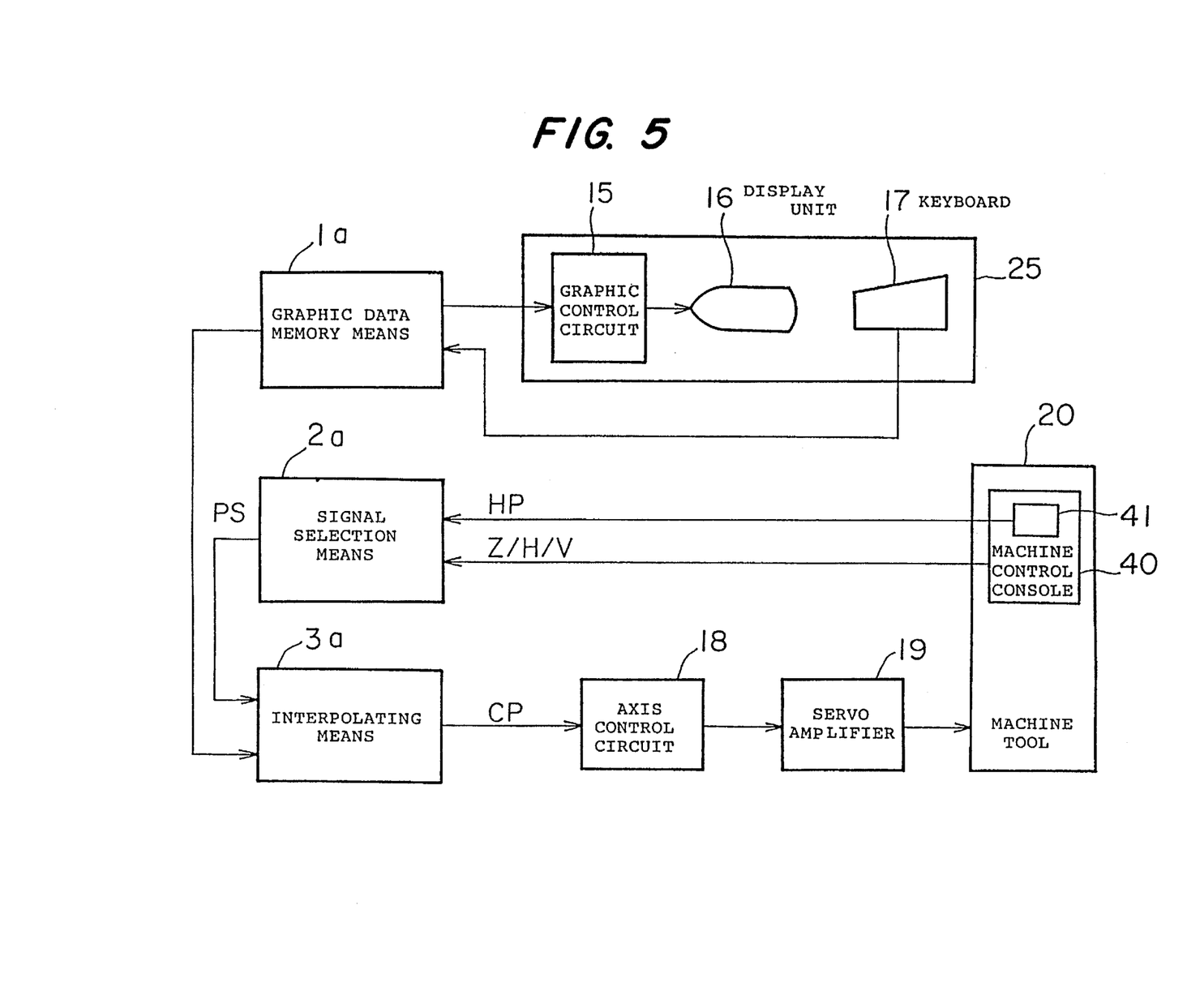
FIG. 5 is a schematic diagram of a numerical control apparatus according to a second embodiment of the present invention.

FIG. 5 schematically illustrates a numerical control apparatus according to a second embodiment of the present invention. The numerical control apparatus has a graphic data memory means a for displaying guidance information through a graphic control circuit 15 on a display unit 16. The graphic data memory means 1a also stores a designated shape such as a straight line, circular arc, or the like which has been entered in an interactive fashion by the operator through a keyboard 17. The stored designated shape is displayed on the display unit 16 through the graphic control circuit 15 as required.

When a signal selection means 2a detects at least one pulse signal HP from a movement command means such as a manual pulse generator 41 or the like, the signal selection means 2a accepts a changing signal Z/H/V which represents either a machine axis signal, parallel movement signal, or perpendicular movement signal from a changing means to specify a type of the movement. Thereafter, the signal selection means 2a selects necessary one or more pulse signals HP according to the received changing signal Z/H/V, and outputs the selected signal or signals as a pulse signal or signals PS. For example, when three pulse signals, an X-axis signal, a Y-axis signal, and a signal according to a changing operation, are inputted, and a signal representing "H" (parallel movement signal) is inputted as a changing signal Z/H/V through the changing means, the X-axis signal, Y-axis signal and parallel movement signal are outputted as the pulse signals PS.

An interpolating means 3a outputs an interpolated pulse signal CP according to the designated shape stored in a graphic data memory means 1a and according to the pulse signal PS from the signal selection means 2a, and then feeds the interpolated pulse signal CP to an axis control circuit 18, which actually comprises circuits for respective three axes. In response to the interpolated pulse signal CP from the interpolating means 3a, the axis control circuit 18 generates speed commands for the respective axes, and sends the speed commands to a servo amplifier 19. The servo amplifier 19 energizes servomotors on a machine tool 20 to control the machine tool 20.

Accordingly, the number of handles of the manual pulse generators serving as the movement command means can be reduced by the changing signal Z/H/V from the changing means mentioned above, which is less costly. The graphic data memory means 1a, the signal selection means 2a and the interpolating means 3a shown in FIG. 5 are software-implemented functions.

A hardware arrangement of the numerical control apparatus according to the second embodiment is same as that of the numerical control apparatus (FIG. 3) according to the first embodiment except a machine control console 40.

Figure 6:
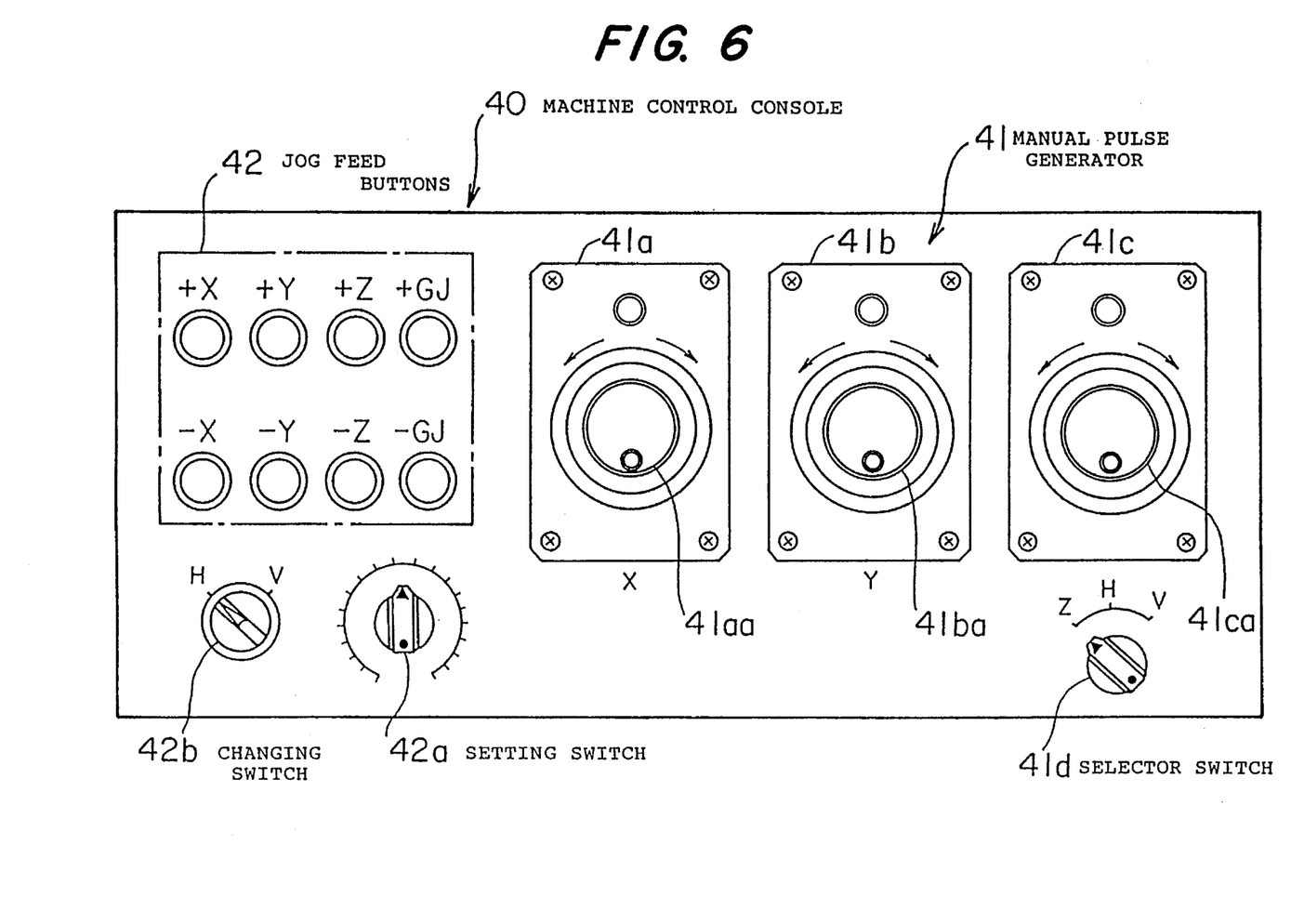
FIG. 6 is a view showing a machine control console for the apparatus of the second embodiment.

FIG. 6 is a view showing the machine control console 40 for the second embodiment. The machine control console 40 shown in FIG. 6 has the manual pulse generator 41, a selector switch 41d, jog feed buttons 42, a setting switch 42a, and a changing switch 42b. The manual pulse generator 41 comprises a manual pulse generator 41a for an X-axis, a manual pulse generator 41b for a Y-axis, and a general-purpose manual pulse generator 41c to move a tool in a Z-axis direction for a direction corresponding to a designated shape. When a handle 41aa of the X-axis manual pulse generator 41a is turned to the left or right, the manual pulse generator 41a generates an X-axis pulse signal HP depending on the rotation of the handle 41aa. Similarly, a Y-axis pulse signal HP is generated by turning a handle 41ba of the Y-axis manual pulse generator and a pulse signal HP corresponding to a selector switch 41d which will be described in detail later on is generated by turning a handle 41ca of the general-purpose manual pulse generator 41c. Each of these pulse signals HP, which is composed of two-phase pulses for determining the rotational direction of the corresponding handle, is sent through the bus 30 to the processor 11 for moving the tool. The selector switch 41d is a switch for selecting a direction of a movement effected by a pulse signal HP generated by the general-purpose manual pulse generator 41c among the Z-axis direction (Z), a parallel movement (H) for moving the tool keeping a constant distance between a current position of the tool and the designated shape, and a perpendicular movement (V) for moving the tool forward and backward in the direction indicated by a normal segment from the current position of the tool to the designated shape. The selector switch outputs the changing signal Z/H/V corresponding to the selection by the operator.

The jog feed buttons 42 comprise a total of 8 buttons including positive and negative feed buttons "+X", "−X" "+Y" "−Y" "+Z" and "−Z" for the respective axes, and positive and negative feed buttons "+GJ" "−GJ" corresponding to the designated shape.

The setting switch 42a sets the number of pulses in a certain period of time which are generated when the jog feed buttons 42 are pressed. To be concrete, the setting switch 42a accepts a pulse which is obtained by dividing down a pulse supplied from a crystal oscillator (not shown) and outputs the obtained pulse at a dividing ratio corresponding to a setting value specified by the operator.

The changing switch 42b is a switch relating to the jog feed button 42, allows an operator to select a parallel movement (H) for moving the tool keeping a constant distance between a current position of the tool and the designated shape and a perpendicular movement (V) for moving the tool forward and backward in the direction indicated by a normal segment from the current position of the tool to the designated shape, and outputs the changing signal Z/H/V corresponding to the selection by the operator.

Accordingly, in order for the operator to move the tool manually, it is required to set the selector switch 41d so that a desired direction is selected, then rotate the handles 41aa, 41ba, 41ca as appropriate. In order for the operator to move the tool in jog feed mode, it is required to set a desired feed rate by rotating the setting switch 42a, then, if necessary, press "+GJ" and "−GJ" after setting the changing switch 42b, and finally press the jog feed button 42 for a desired direction.

Now, tool moving directions when the handle 41ca is rotated with the selector switch 41d being set to the direction (H or V) corresponding to the designated shape and when positive and negative feed buttons "+GJ", "−GJ" in the jog feed buttons 42 corresponding to the designated shape will be described. As the same result is obtained when rotating the handle 41ca and when the jog feed buttons "+GJ" or "−GJ", the former is described hereinafter.

Figure 7:
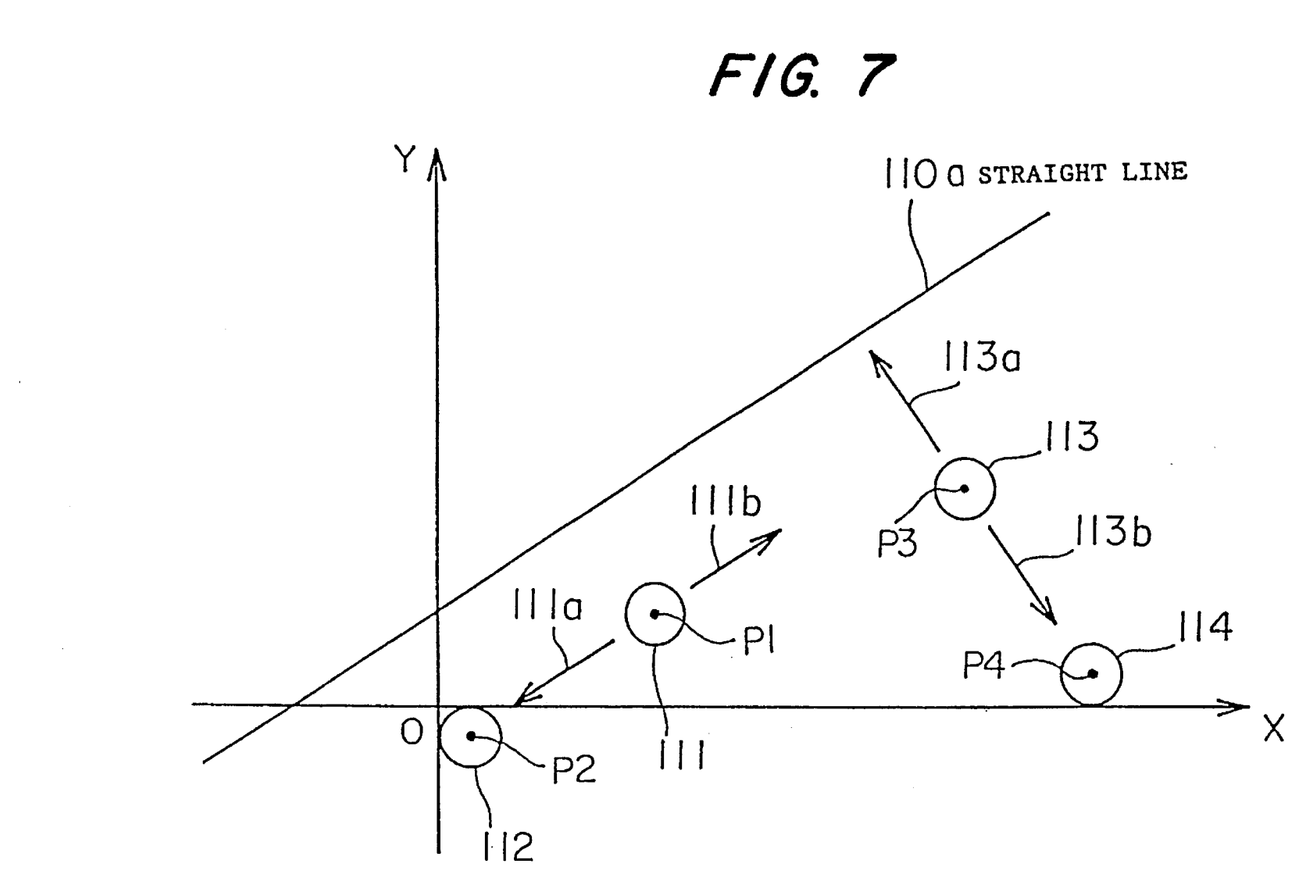
FIG. 7 is a view showing a tool move direction.

FIG. 7 shows the tool moving directions and it is supposed that a straight line is defined as a designated shape therein. In the FIG. 7, a straight line 110a is defined as a designated shape on the X-Y coordinate plane. This straight line 110a is a stored figure (designated shape) which has been entered by the graphic data memory means 1 shown in FIG. 1. Center of a tool 111 locates at a position P1, and center of a tool 113 locates at a position P3.

When the setting switch 41d in the FIG. 6 is set to "H (parallel moving)" and the handle 41ca is rotated to the left at this time, the tool moves in a direction 111a parallel to the straight line 110a according to the rotated angle of the handle 41ca. Conversely, when the handle 41ca is rotated to the right, the tool moves in a direction 111b parallel to the straight line 110a according to the rotated angle of the handle 41ca.

When the setting switch 41d is set to "V (perpendicular)" and the handle 41ca is rotated to the left, the tool moves in a direction 113a perpendicular to the straight line 110a according to the rotated angle of the handle 41ca. Conversely, when the handle 41ca is rotated to the right, the tool moves in a direction 113b perpendicular to the straight line 110a according to the rotated angle of the handle 41ca.

The tool moving direction depending on the rotational direction either to the right or the left of the handle 41ca can be set by the operator by inputting appropriate parameters or data according to guidance information. For example, the operator is allowed to specify the tool moving direction for the tool perpendicular movement either to the direction 113a or 113b as desired when the handle 4ca is turned to the right, resulting in improvement of working efficiency.

The tool movement using the handle 41ca may be set so that an interpolated pulse from the interpolating means 3a shown in FIG. 5 is stopped when the tool reaches to a given coordinate value. For example, when a given coordinate value is set as "0" of the X-axis, the tool stops at a position P2. Where a tool 112 locates and never moves in the direction 111a any more if the handle 41ca is rotated to the left. As is obvious from FIG. 7, the X-coordinate value of the position P2 where the tool 112 locates is not "0" but the position compensated by the tool radius amount from "0" in positive X-direction.

Similarly, when a given coordinate value is set as "0" of the Y-axis, the tool stops at a position P4 where a tool 114 locates and never moves in the direction 113b any more if the handle 41ca is rotated to the right. The Y-coordinate value of the position P4 where the tool 114 locates is also not "0" but the position compensated by the tool radius amount from "0" in positive Y-direction.

By providing a limit coordinate value represented by a given coordinate value mentioned above, the tool is prevented to move to an inappropriate position if the operator makes an inappropriate operation through the machine control console 40.

In the above embodiment, although feed rate of the tool has not been described, feed rate data may be specified when entering a designated shape with the graphic data memory means 1a by providing a feed rate column F on each of machining guidance screens. An override switch on the numerical control apparatus may be used to adjust the feed rate of the tool.

In the embodiment mentioned above, the pulse signal PS is outputted By the signal selection means 2a in response to the pulse signal HP from the movement command means comprising three manual pulse generators and the changing signal Z/H/V from the changing means. However, the pulse signal may be outputted by the signal selection means 2a in response to a pulse signal HP from a movement command means comprising at least one manual pulse generator and a changing signal Z/H/V from the changing means. For example, in the movement command means comprising four manual pulse generators, three manual pulse generators may output respective machining axis signals and the remaining manual pulse generator may output a parallel movement signal to command parallel movement of a tool along a designated shape or perpendicular signal to command perpendicular movement of a tool. Thereby working efficiency is improved when three machining axes are frequently used.

In the above description, although some of machining guidance functions has been described, it will be readily understood that the other machining guidance functions are also applicable.

By entering a designated shape through the guidance information Screen and operating the machine control console 40 in the manner described above, the operator can readily obtain a partial machining of a prototype or the like by moving the tool in two or more axis directions simultaneously as is the case to machine an oblique straight line, circular arc, or the like.

While the above embodiment has been described with respect to a milling machine, the present invention is also applicable to other machine tools such as a lathe or the like.

The above guidance function may be incorporated in an ordinary numerical control apparatus, or may be arranged as an especially inexpensive numerical control apparatus.

According to the second embodiment, as described above, plural manual pulse generators are provided, resulting improvement of working efficiency.

Figure 8:
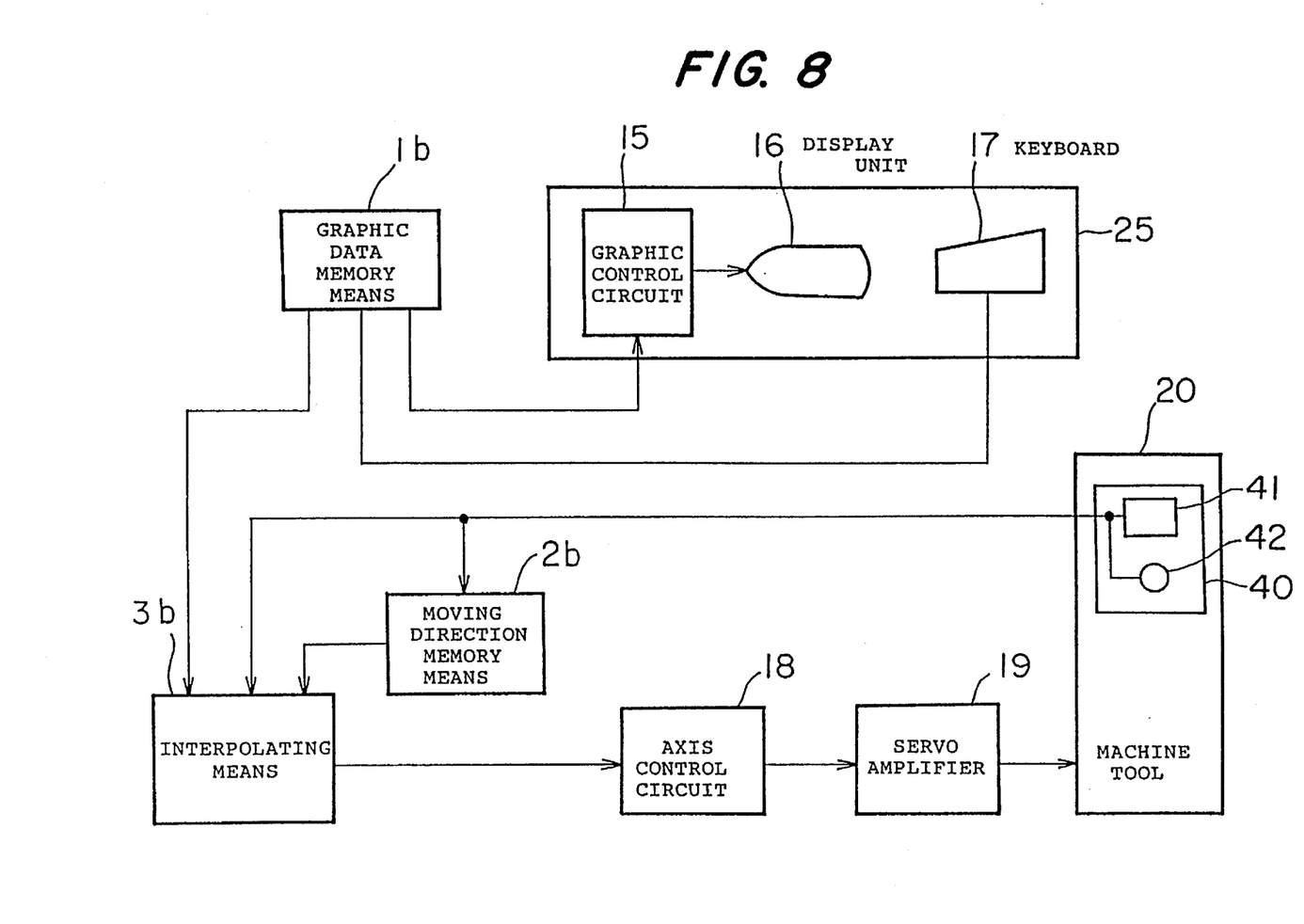
FIG. 8 is a schematic diagram of a numerical control apparatus according to a third embodiment of the present invention.

FIG. 8 schematically illustrates a numerical control apparatus according to a third embodiment of the present invention.

The numerical control apparatus has a graphic data memory means 1b for displaying guidance information through a graphic control circuit 15 on a display unit 16. The graphic data memory means 1b also stores a designated shape such as a straight line, circular arc, or the like which has been entered in an interactive fashion by the operator through a keyboard 17. The stored designated shape is displayed on the display unit 16 through the graphic control circuit 15 as required.

When a moving direction memory means 2b receives a pulse signal from a manual pulse generator 41, the moving direction memory means 2b determines and stores a tool moving direction.

When the pulse signal source is changed to the job feed button 42 for guidance from the manual pulse generator 41, an interpolating means 3b generates an interpolated pulse signal so as to move the tool in the moving direction stored in the moving direction memory means 2b and feeds the interpolated pulse signal to an axis control circuit 18, which actually comprises circuits for respective three axes. In response to the interpolated pulse signal CP from the interpolating means 3b, the axis control circuit 18 generates speed commands for the respective axes, and sends the speed commands to a servo amplifier 19. The servo amplifier 19 energizes servomotors on a machine tool 20 to control the machine tool 20.

The graphic data memory means 1b and the interpolating means 3b mentioned above are software-implemented functions.

A hardware arrangement of the numerical control apparatus according to the third embodiment is same as that of the numerical control apparatus according to the first embodiment. (FIG. 3)

Figure 9:
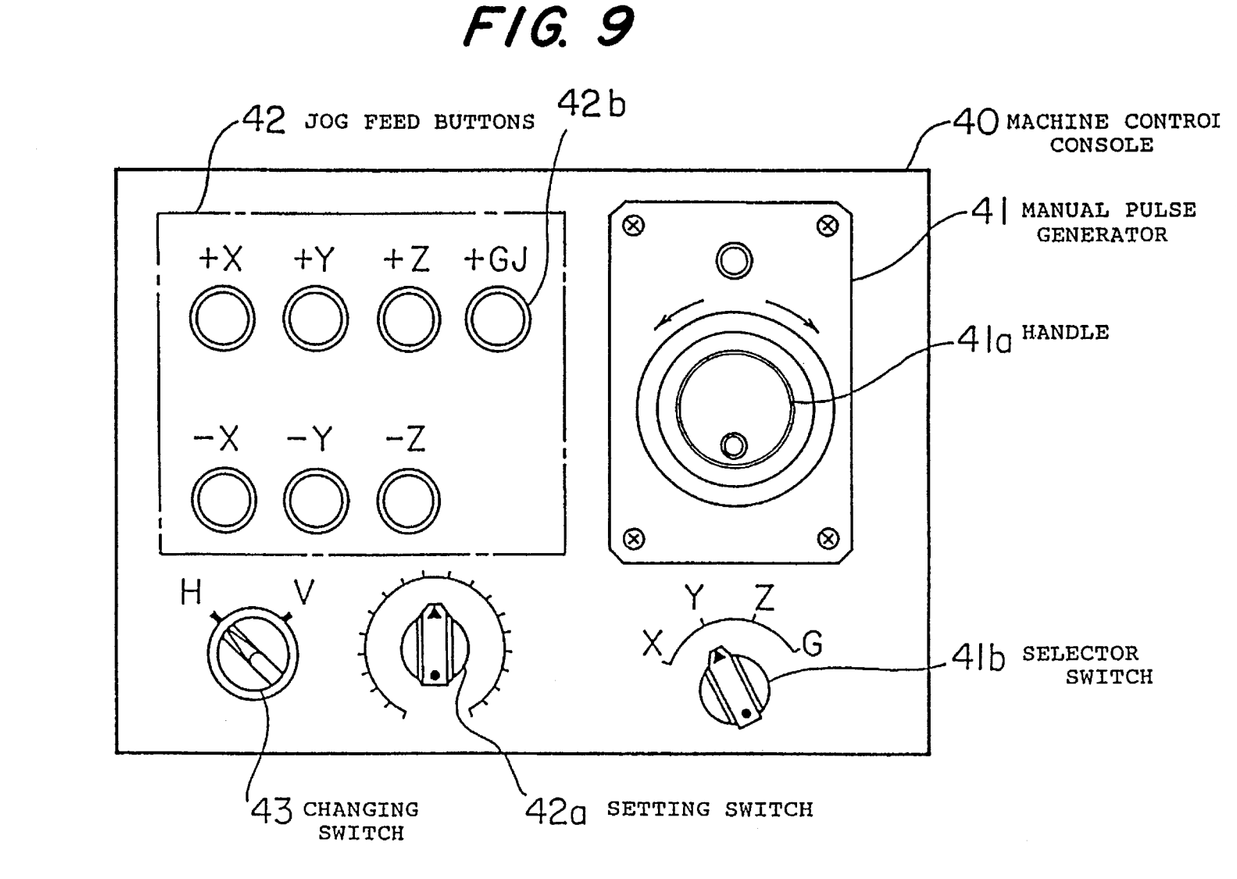
FIG. 9 is a view showing a machine control console of the apparatus of the third embodiment.

FIG. 9 is a view showing the machine control console 40 on the machine tool 20 by way of example. The machine control console 40 shown in FIG. 9 has a manual pulse generator 41, a selector switch 41b, jog feed buttons 42, a setting switch 42a, and a changing switch 43.

When a handle 41a is turned to the left or right, the manual pulse generator 41 generates a pulse signal depending on the rotation of the handle 41a. The pulse signal, which is composed of two-phase pulses for determining the direction in which the handle 41a is turned, is sent through the bus 30 to the processor 11 for moving the tool. The selector switch 41b is a switch for selecting a pulse signal generated by the manual pulse generator 41 in either an X-axis direction (X), a Y-axis direction (Y), a Z-axis direction (Z), or a direction (G) which corresponds to the designated shape by guidance machining.

The jog feed buttons 42 comprise a total of 7 buttons including positive and negative feed buttons "+X", "−X", "+Y" "−Y" "+Z" and "−Z" for the respective axes, and a jog feed button 42b "GJ" for commanding a guidance machining based on the designated shape.

The setting switch 42a sets the number of pulses in a certain period of time which are generated when the jog feed buttons 42 are pressed. To be concrete, the setting switch 42a accepts a pulse which is obtained by dividing down a pulse supplied from a crystal oscillator (not shown) and outputs the obtained pulse at a dividing ratio corresponding to a setting value specified by the operator.

The changing switch 43 is a switch which is used for guidance machining described in detail later on, and allows an operator to select a parallel movement (H) for moving the tool keeping a constant distance between a current position of the tool and the designated shape and a perpendicular movement (V) for moving the tool forward and backward in the direction indicated by a normal segment from the current position of the tool to the designated shape, and outputs the changing signal H/V corresponding to the selection by the operator. Here, the term "parallel movement" is to move a tool keeping a constant distance between the current position of the tool and a designated shape such as an oblique straight line, circular arc, or the like, and the term "perpendicular movement" is to move the tool forward and backward in the direction indicated by a normal segment from the current position of the tool to the designated shape.

Accordingly, in order for the operator to move the tool manually, it is required to set the selector switch 41b and the changing switch 43 so that a desired direction is selected, and then rotate a handle 41a as appropriate. In order for the operator to move the tool in jog feed mode, it is required to set a desired feed rate by rotating the setting switch 42a, and then press the jog feed button 42b for a desired direction. At this time, the direction to move the tool is controlled to be the same direction as the tool is moved in by the handle 41a just before the jog feed button 42b is pressed.

Now, a procedure for effecting guidance machining will be described below.

Figure 10:
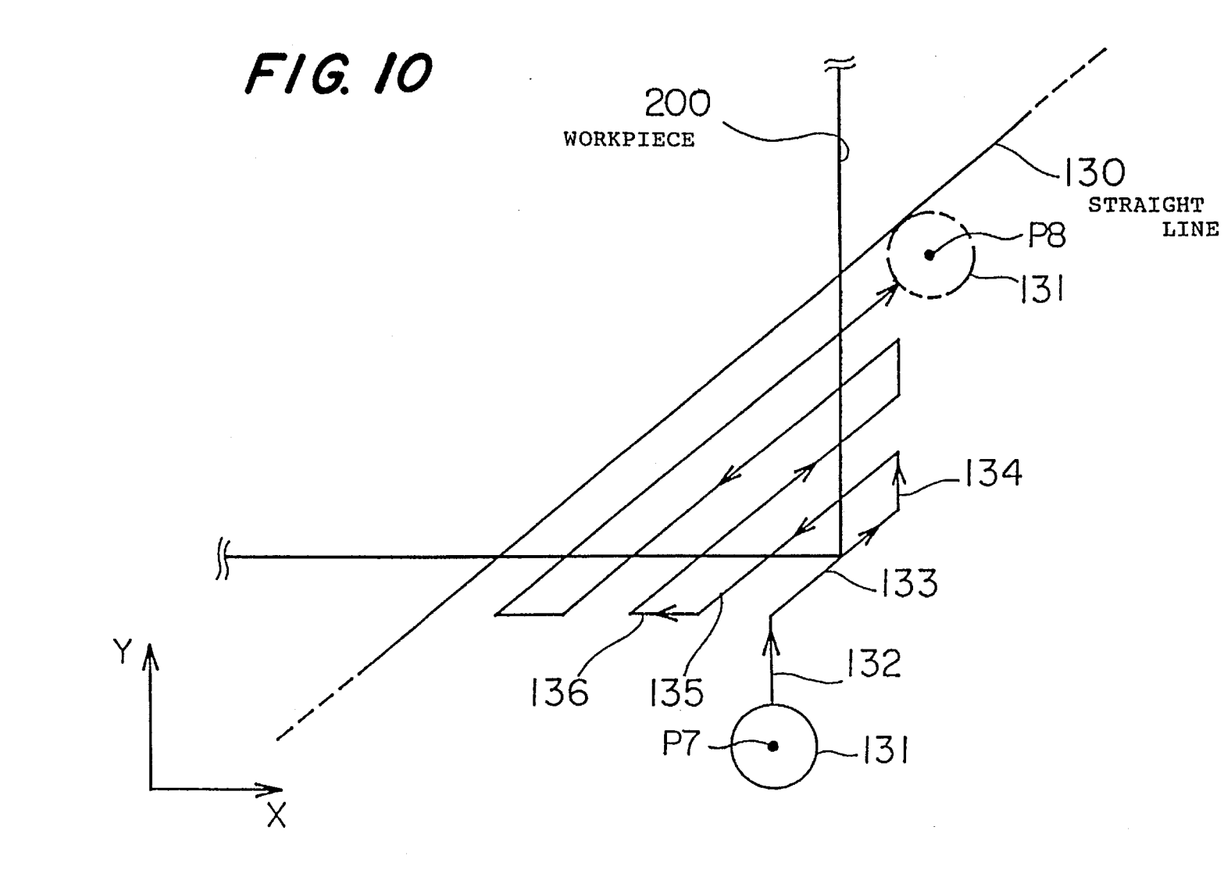
FIG. 10 is a view showing a guidance machining procedure by way of example.

FIG. 10 illustrates a guidance machining procedure by way of example. In the FIG. 10, a straight line 130 is defined as a designated shape for machining a lower right corner of a workpiece 200. This straight line 130 is a stored figure (designated shape) which has been entered by the graphic data memory means 1 shown in FIG. 1. Center of a tool 131 locates at a position P7 initially.

First, an operator carries out an approach operation by setting a selector switch 41b shown in FIG. 9 to "Y" and rotating a handle 41a to the right. At this time, the tool 131 moves in a direction 132. After completion of the approach operation, the operator proceeds to the guidance machining. In order for the operator to carry out the guidance machining, it is required to set the selector switch 41b to "G" and the changing switch 43 to "H". Thereby the tool 131 starts parallel movement by rotating the handle 41a.

However, as an oblique straight line is selected as a designated shape in this embodiment, it is difficult for the operator to know right now the direction to rotate the handle 41a to move the tool 131 parallel to the designated shape. Therefore, the operator rotates the handle 41 slightly to the left or the right to confirm the moving direction of the tool 131, and if the tool 131 moves in the desired direction, the operator continues to rotate the handle 41a as it is to make a first machining by the parallel movement. In this embodiment, it is supposed that the tool 131 moves in a direction 133 when the handle 41a is rotated to the right.

On the otherhand, in the case a moving path of the tool 131 is long, it is tedious to continue rotating the handle 41a all through the machining. In such a case, the operator may change the tool feed operation to a jog feed mode by jog feed buttons 42. Thereby while any of jog feed buttons 42 is pressed, the tool 131 can be moved in the direction represented by the jog feed button at a constant feed rate. As the guidance machining is effected in this embodiment, the operator presses the jog feed button 42b.

In this embodiment, although neither "+" direction nor "−" direction is assigned to the jog feed button 42b, the jog feed button 42b has been set to move the tool 131 in the same direction as the tool is moved in by the handle 41a just before the Jog feed button 42b is pressed. That is, the moving direction memory means 2b always memorizes current rotational direction of the handle 41a, and when the jog feed buttons 42b are pressed to change the operation mode to the jog feed mode, the interpolating means 3b outputs an interpolated pulse signal so as to maintain the direction of the handle 41a just before the jog feed button 42b are pressed.

As the machining in, the direction 133 is completed in this way, then, it is necessary to move the tool 131 in a direction 134 to effect cut-in operation. In this case, the operator sets the selector switch 41b to "Y" and rotates the handle 41a to the right to move the tool 131 in a direction 134 for the next machining. Then the operator sets the selector switch 41b to "G" and moves the tool 131 in a direction 135 by the same procedure mentioned above to effect a second machining. After that, the operator set the selector switch 41b to "X" and rotates the handle 41a to the left for the next machining to move the tool 131 in a direction 136.

By repeating such operations as mentioned above, the tool 131 is finally moved to a position P8 for machining a lower right corner of a workpiece 200. Consequently, by effecting the cut-in operation (movement parallel to the machining axis) and the cutting operation (movement parallel to the designated shape) repeatedly, a prototype or the like can be machined with more complex procedures.

The cut-in operation may be effected by a perpendicular movement to the machining axis rather than the parallel movement mentioned above. In this case, the operator sets the selector switch 41b to "G" and the changing switch 43 to "V". Then the operator confirms the moving direction of the tool 131 by rotating the handle 41a slightly and presses the jog feed button 42b to allow the tool 131 to start the cut-in operation perpendicular to the straight line 130.

According to the present embodiment, as described above, in the case the guidance machining is to be effected, when the jog feed button 42b is pressed, the tool 131 is moved to the same direction as is represented by the rotation of the handle 41a just before the jog feed button 42b is pressed, so that the operator can effects the jog feed operation knowing the moving direction of the tool 131, resulting in easier guidance machining.

In the third embodiment, a linear machining has been described as an example of guidance machining, similar operation is applicable to circular arc machining by supposing a movement in the direction along the circular arc as the "parallel movement" and a movement in a normal direction of a tangential line as the "perpendicular movement". Further, other shapes can be machined by similar method described above.

In the above embodiment, although feed rate of the tool has not been described, feed rate data may be specified when entering a designated shape with the graphic memory means 1b by providing a feed rate column F on each of machining guidance screens. Or, an override switch on the numerical control apparatus may be used to adjust the feed rate of the tool.

While the above embodiment has been described with respect to a milling machine, the present invention is also applicable to other machine tools such as a lathe or the like.

In the third embodiment, for the guidance machining, only one jog feed button 42b is provided. However two jog feed buttons for both "positive" and "negative" directions may be provided as the other jog feed buttons. In this case, however, as the slight rotation of the handle 41a is required for the oblique line machining or circular arc machining, it is necessary to move the tool in the same direction as is represented by the rotation of the handle 41a regardless of the "positive" or "negative" mode of the jog feed button, when the selector switch 41b is changed to "G" just after the operation of the handle 41a.

According to the third embodiment, as described above, a designated shape such as a oblique straight line, circular arc or the like is entered and stored in an interactive fashion into the graphic data memory means, the moving direction memory means reads and stores the tool moving direction in response to the pulse signal from the manual pulse generator, and outputs an interpolated pulse by the interpolating means so as to move the tool in the movement direction stored in the moving direction memory means when the pulse signal source is changed from the manual pulse generator to the jog feed button for guidance machining. Therefore, the guidance machining can be easily effected while pressing the jog feed button for the guidance machining by delicately controlling the manual pulse generator to seek the tool movement direction, and by pressing the jog feed button for guidance machining immediately after the tool movement in the desired direction is confirmed, resulting in easier operation.

A numerical control apparatus may be arranged so as to include all or some of the embodiments described above.

The present invention is not limited to the above embodiments, but various changes and modifications may be made therein without departing from the scope of the invention.

We claim:

1. A numerical control apparatus for controlling a machine tool having at least two axes, comprising:
   graphic data memory means for storing a designated shape entered in an interactive fashion according to guidance information;
   load determination means for detecting a load of a servomotor, determining whether said detected load decreases by a given ratio and outputting a drive stop signal when said load decreases by said given ratio;
   movement command means for outputting a pulse signal to command movement of a tool; and
   interpolating means for interpolating said pulse signal to move said tool parallel to said designated shape, outputting said interpolated pulse signal and stopping said outputting of said interpolated pulse signal in response to said drive stop signal.

2. A numerical control apparatus according to claim 1, wherein said movement command means comprises a manual pulse generator or a jog feed button.

3. A numerical control apparatus according to claim 1, wherein said load determination means outputs said drive stop signal when said servomotor load decreases by said given ratio after said servomotor load reaches a machining time load.

4. A numerical control apparatus for controlling each of axes of a machine tool according to a machining program, comprising:
   load determination means for detecting a load of a servomotor, determining whether said detected load decreases by a given ratio and outputting a drive stop signal when said load decreases by said given ratio; and
   interpolating means for generating an interpolated signal according to a command of said machining program, and stopping said outputting of said interpolated pulse signal in response to said drive stop signal.

5. A numerical control apparatus for controlling a machine tool having at least two axes, comprising:
   graphic data memory means for storing a designated shape entered in an interactive fashion according to guidance information;
   a plurality of manual pulse generators for generating pulse signals for commanding movement of a tool;
   changing means for outputting a changing signal which indicates that at least one pulse signal from one of said manual pulse generators is one of a machining axis signal to control a machine tool, a parallel movement signal to move said machine tool while keeping a constant distance between a current position of the machine tool and said designated shape, and a perpendicular movement signal to move the machine tool forward and backward in the direction indicated by a normal segment from the current position of the machine tool to the designated shape;
   signal selection means for selecting and outputting a required pulse signal in response to said one pulse signal and said changing signal; and
   interpolating means for outputting an interpolated pulse according to said designated shape in response to said required pulse signal form said signal selection means.

6. A numerical control apparatus according to claim 5, wherein each of said plurality of manual generators is provided for X-axis movement, for Y-axis movement, and for Z-axis/parallel movement/perpendicular movement, respectively.

7. A numerical control apparatus for controlling a machine tool having at least two axes, comprising:
   graphic data memory means for storing a designated shape entered in an interactive fashion according to guidance information;
   a manual pulse generator for outputting a pulse signal to command a moving direction and feed rate of a tool;
   a jog feed button for guidance machining, which is provided separately from said manual pulse generator, for outputting a constant frequency pulse signal;
   moving direction memory means for reading and storing a moving direction of said tool in response to said pulse signal from said manual pulse generator; and
   interpolating means for outputting an interpolated pulse to move said tool in said moving direction stored in said moving direction memory means when a pulse signal source is changed from said manual pulse generator to said jog feed button for guidance machining.

8. A numerical control apparatus according to claim 7, further comprising a changing switch for generating a moving direction command of said tool to change a parallel movement signal to move said tool while keeping a distance between a current position of said tool and said designated shape, and to change a perpendicular movement signal to move said tool forward and backward in the direction indicated by a normal segment from the current position of said tool to said designated shape, said interpolating means being arranged to move said tool in accordance with said moving direction command of said changing switch when said jog feed button for guidance is pressed.

9. A numerical control apparatus according to claim 5, wherein said designated shape is an oblique straight line.

10. A numerical control apparatus according to claim 5, wherein said designated shape is a circular arc.

11. A numerical control apparatus according to claim 7, wherein said designated shape is an oblique straight line.

12. A numerical control apparatus according to claim 7, wherein said designated shape is a circular arc.

* * * * *

UNITED STATES PATENT AND TRADEMARK OFFICE
CERTIFICATE OF CORRECTION

PATENT NO. : 5,453,674
DATED : September 26, 1995
INVENTOR(S) : Seki: Masaki et al.

It is certified that error appears in the above-indentified patent and that said Letters Patent is hereby corrected as shown below:

On the title page,
   item [19] change "Seki: Masaki" to --Masaki Seki--;
      Item [75] change "Seki: Masaki" to --Masaki Seki--.

Col. 6, line 3, change "63" to --43--;
   line 47, change "a" to --1a--;

Col. 7, line 22, change "1a" to --1a--.

Col. 9, line 5, change "P2. Where" to --P2 where--;
   line 45, after "shape or" insert --a--
   line 53, change "Screen" to --screen--.

Col. 12, line 4, change "Jog" to --jog--;
   line 12, after "in" (first occurrence) delete ","

Signed and Sealed this

Sixth Day of February, 1996

BRUCE LEHMAN

Attest:

Attesting Officer     Commissioner of Patents and Trademarks